United States Patent
Tomescu

(10) Patent No.: US 11,668,248 B2
(45) Date of Patent: Jun. 6, 2023

(54) START-UP SYSTEM AND METHOD FOR ROTOR BOW MITIGATION

(71) Applicant: PRATT & WHITNEY CANADA CORP., Longueuil (CA)

(72) Inventor: Dana Tomescu, Brampton (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 310 days.

(21) Appl. No.: 16/895,223

(22) Filed: Jun. 8, 2020

(65) Prior Publication Data

US 2021/0301732 A1 Sep. 30, 2021

Related U.S. Application Data

(60) Provisional application No. 63/000,725, filed on Mar. 27, 2020.

(51) Int. Cl.

| | |
|---|---|
| *F02C 9/00* | (2006.01) |
| *F01D 19/02* | (2006.01) |
| *F02C 7/268* | (2006.01) |
| *F01D 21/00* | (2006.01) |
| *F01D 25/34* | (2006.01) |

(52) U.S. Cl.
CPC ............ *F02C 9/00* (2013.01); *F01D 19/02* (2013.01); *F01D 21/00* (2013.01); *F01D 25/34* (2013.01); *F02C 7/268* (2013.01); *F05D 2220/323* (2013.01); *F05D 2260/85* (2013.01); *F05D 2270/303* (2013.01); *F05D 2270/313* (2013.01); *F05D 2270/44* (2013.01); *F05D 2270/708* (2013.01)

(58) Field of Classification Search
CPC ...... F02C 9/00; F02C 9/28; F02C 7/26; F02C 7/268; F01D 19/02; F01D 21/00; F01D 21/003; F01D 25/34; F05D 2220/323; F05D 2260/85; F05D 2270/303; F05D 2270/313; F05D 2270/44; F05D 2270/708
See application file for complete search history.

(56) References Cited

U.S. PATENT DOCUMENTS

| 8,820,046 B2 | 9/2014 | Ross et al. |
| 9,664,070 B1 | 5/2017 | Clauson et al. |
| (Continued) | | |

FOREIGN PATENT DOCUMENTS

EP 3205843 1/2019

OTHER PUBLICATIONS

"CFM Details Leap Nozzle Coking Research, Potential Fixes" by Chris Kjelgaard, Jun. 17, 2019 (https://www.ainonline.com/aviation-news/air-transport/2019-06-17/cfm-details-leap-nozzle-coking-research-potential-fixes).

*Primary Examiner* — Loren C Edwards
(74) *Attorney, Agent, or Firm* — Norton Rose Fulbright Canada LLP

(57) ABSTRACT

There is provided a rotor bow mitigation system and method for an aircraft engine. At least one value of at least one engine parameter prior to a shutdown of the engine is obtained, the at least one engine parameter comprising a first temperature internal to the engine. A second temperature external to the engine is measured and a motoring duration and a motoring interval for the engine are determined based on at least the first temperature and on the second temperature. Upon detecting a start indication for the engine, the engine is motored for the motoring duration and at the motoring interval.

13 Claims, 5 Drawing Sheets

(56) References Cited

U.S. PATENT DOCUMENTS

| | | |
|---|---|---|
| 9,988,987 B2 | 6/2018 | Mouze et al. |
| 10,040,577 B2 | 8/2018 | Teicholz et al. |
| 10,125,690 B2 | 11/2018 | Zaccaria et al. |
| 10,125,691 B2 | 11/2018 | Feulner et al. |
| 10,174,678 B2 | 1/2019 | Schwarz et al. |
| 10,443,505 B2 | 10/2019 | Virtue, Jr. et al. |
| 10,443,507 B2 | 10/2019 | Schwarz et al. |
| 2017/0234167 A1 | 8/2017 | Stachowiak et al. |
| 2017/0234230 A1 | 8/2017 | Schwarz et al. |
| 2017/0234231 A1* | 8/2017 | Virtue, Jr. ............... F01D 25/34 416/1 |
| 2017/0234232 A1 | 8/2017 | Sheridan et al. |
| 2017/0234233 A1 | 8/2017 | Schwarz et al. |
| 2017/0234235 A1 | 8/2017 | Pech |
| 2017/0234236 A1* | 8/2017 | Feulner ................... F01D 19/02 60/778 |
| 2017/0234238 A1 | 8/2017 | Schwarz et al. |
| 2017/0335768 A1 | 11/2017 | Steen et al. |
| 2017/0335865 A1 | 11/2017 | Steen |
| 2017/0363012 A1 | 12/2017 | Clauson et al. |
| 2018/0010480 A1 | 1/2018 | Hockaday et al. |
| 2018/0142623 A1 | 5/2018 | Chiabrando et al. |
| 2018/0023479 A1 | 9/2018 | Funk et al. |
| 2018/0283197 A1 | 10/2018 | Jackowski et al. |
| 2018/0306065 A1 | 10/2018 | Keenan et al. |
| 2018/0334963 A1 | 11/2018 | Fernholz |
| 2018/0355764 A1 | 12/2018 | Clauson et al. |
| 2019/0040799 A1 | 2/2019 | Gelwan et al. |
| 2019/0178165 A1 | 6/2019 | Chiasson et al. |
| 2019/0186368 A1 | 6/2019 | Sharma et al. |

\* cited by examiner

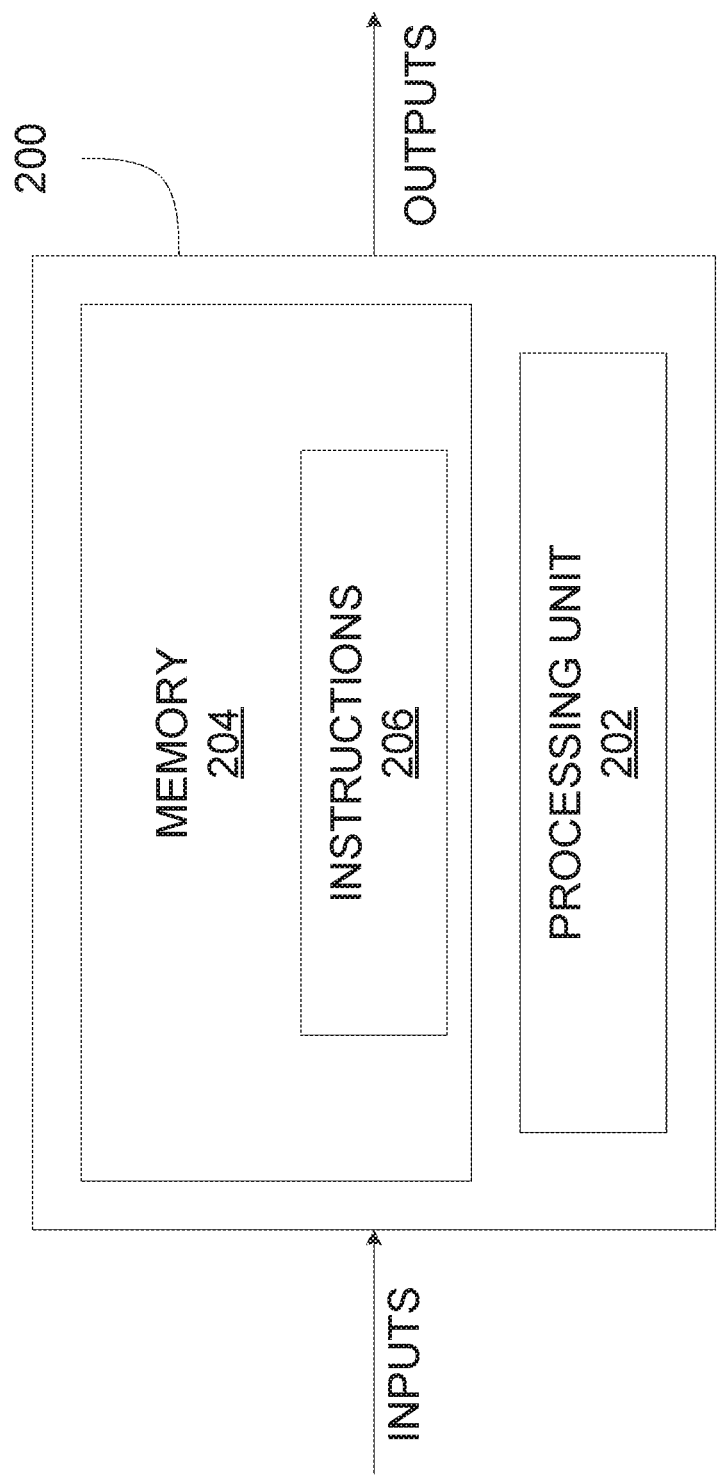

START-UP SYSTEM AND METHOD FOR ROTOR BOW MITIGATION

CROSS REFERENCE TO RELATED APPLICATIONS

This patent application claims priority of U.S. provisional Application Ser. No. 63/000,725, filed on Mar. 27, 2020, the entire contents of which are hereby incorporated by reference.

TECHNICAL FIELD

The application relates generally to gas turbine engines and, more particularly, to rotor bow mitigation for a gas turbine engine.

BACKGROUND OF THE ART

Following shutdown of a gas turbine engine, residual heat is trapped in the engine core. As the temperature of the engine decreases towards ambient temperature, a thermal gradient develops in the engine leading to the upper portion of the engine cooling more slowly than the lower portion. This results in distortion (or bowing) of the engine components due to thermal expansion (or contraction). Damage can be caused to the engine if the engine rotors are spooled up while in a bowed state and it is undesirable to restart the engine until the engine cools and the rotor bow dissipates to an acceptable level.

As such, there is need for improvement.

SUMMARY

In one aspect, there is provided a rotor bow mitigation method for an aircraft engine, the method comprising, at a processing device, obtaining at least one value of at least one engine parameter prior to a shutdown of the engine, the at least one engine parameter comprising a first temperature internal to the engine, measuring a second temperature external to the engine, determining a motoring duration and a motoring interval for the engine based on at least the first temperature and on the second temperature, and upon detecting a start indication for the engine, motoring the engine for the motoring duration and at the motoring interval In another aspect, there is provided a rotor bow mitigation system for an aircraft engine, the system comprising a memory and a processing unit coupled to the memory and configured for obtaining at least one value of at least one engine parameter prior to a shutdown of the engine, the at least one engine parameter comprising a first temperature internal to the engine, measuring a second temperature external to the engine, determining a motoring duration and a motoring interval for the engine based on at least the first temperature and the second temperature, and upon detecting a start indication for the engine, motoring the engine for the motoring duration and at the motoring interval.

In a further aspect, there is provided a non-transitory computer readable medium having stored thereon program code executable by a processor for obtaining at least one value of at least one engine parameter prior to a shutdown of an aircraft engine, the at least one engine parameter comprising a first temperature internal to the engine, measuring a second temperature external to the engine, determining a motoring duration and a motoring interval for the engine based on at least the first temperature and the second temperature, and upon detecting a start indication for the engine, motoring the engine for the motoring duration and at the motoring interval.

DESCRIPTION OF THE DRAWINGS

Reference is now made to the accompanying figures in which:

FIG. 2 is a block diagram of a computing device for implementing the control unit of FIG. 1B, in accordance with an illustrative embodiment;

DETAILED DESCRIPTION

Figure 1A:
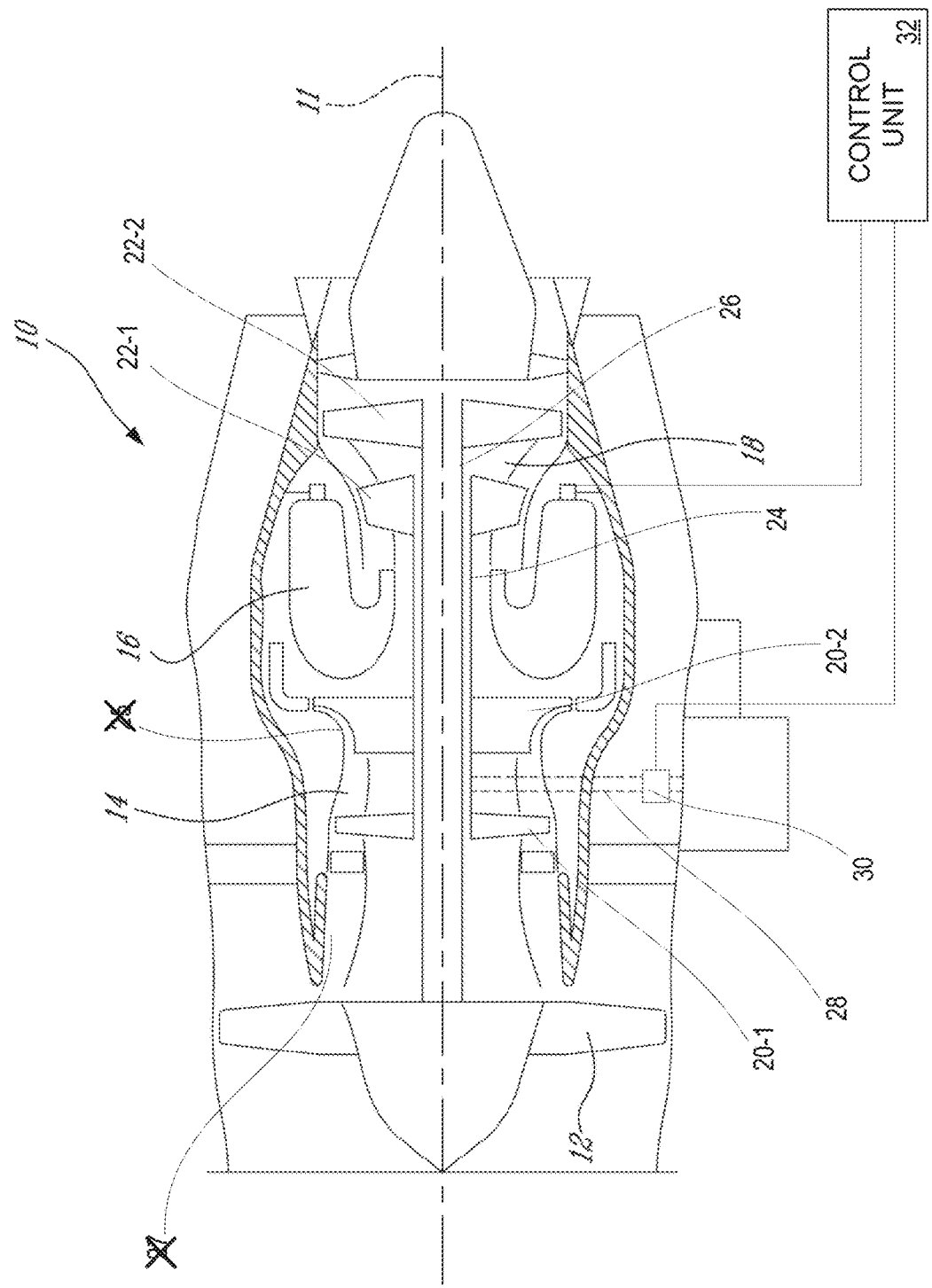
FIG. 1A is a schematic cross-sectional view of a gas turbine engine.

FIG. 1A illustrates a gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases.

Compressor section 14 includes compressors 20, namely, a low-pressure compressor 20-1 and a high-pressure compressor 20-2. Turbine section 18 includes turbines 22, namely, a high-pressure turbine 22-1 and a low-pressure turbine 22-2.

Fan 12, compressors 20 and turbines 22 are mounted to shafts 24, 26 for rotation about a longitudinal axis 11. Low-pressure compressor 20-1, high-pressure compressor 20-2 and high-pressure turbine are mounted to a common first shaft 24, and may be collectively referred to as a high-speed spool or high-speed rotor assembly. Fan 12 and low-pressure turbine 22-2 are mounted to a common second shaft 26 and may be collectively referred to as a low-speed spool or low-speed rotor assembly. During operation, compressors 20 and combustor 16 provide a stream of high-temperature and high-pressure gas to turbines 22, causing turbines 22 to rotate. Rotation of turbines 22 drives rotation of compressors 20 and fan 12 by way of shafts 24, 26.

Engine 10 has an air starter 28 for inducing direct rotation of the high-speed and indirect rotation of the low-speed rotor assemblies at engine start-up. Air starter 28 is provided with a supply of pressurized air from an independent unit. Flow of air to starter 28 is modulated by a starter valve (also referred to as a starter air valve) 30.

Starter valve 30 is solenoid-actuated and operated (e.g. engaged) by a signal from a control unit 32. Control unit 32 is in communication with one or more aircraft systems (not shown), which may include, but are not limited to, flight controls, electric systems, auxiliary power units, and the like, as well as with aircraft avionics (not shown), which may include any and all systems related to control and management of the aircraft, such as but not limited to communications, navigation, display, monitoring, flight-control systems, collision-avoidance systems, flight recorders, weather systems, and aircraft management system. The control unit 32 is also in communication with the cockpit of the aircraft (reference 106 in FIG. 1B) as well as with a plurality of control elements and one or more aircraft sensors 108, such as a throttle, speed, vibration, and temperature sensors, and the like, configured to acquire measurements (or readings) of given parameters.

While the engine 10 is illustrated and described herein as using a starter valve 30 and an air starter 28 for inducing rotation of the engine 10, it should be understood that other embodiments may apply. The systems and methods described herein may apply to engines as in 10 that use any suitable means of providing rotational power to the engine, including, but not limited to, an air turbine starter, a starter air valve, a pneumatic starter motor, a starter generator, and an electric motor.

In addition, while the engine 10 is illustrated and described herein as being a turbofan engine, it should be understood that this is for illustration purposes only. The systems and methods described herein may apply to any suitable type of engine including, but not limited to, a turbofan engine, a geared turbofan engine, a turboprop engine, a turboshaft engine, an auxiliary power unit, an electric engine, and a hybrid electric propulsion system.

Referring back to FIG. 1A, during operation of engine 10, pressurization of air by compressors 20 and fuel combustion in combustor 16 produce high temperatures, particularly in the combustor 16 and turbine section 18. Temperatures may depend on the operating state of engine 10, among other conditions. For example, high-thrust operation, such as high-speed cruising, may rely on high rates of fuel combustion, which may produce relatively high temperatures in turbine 18. Conversely, other operating states may require less thrust and thus may entail combustion of lower quantities of fuel. For example, while taxiing, (e.g. on a runway), fuel is combusted at a much lower rate, and less heat is introduced to engine 10.

High temperatures within engine 10 may persist for a period of time after engine shutdown. For example, airflow through engine 10 substantially ceases after engine 10 is shut down and air tends to stagnate within the core of engine 10. Thus, heat dissipates relatively slowly from the high operating temperatures of components.

While engine 10 is shut down, temperature distribution within the engine 10 may be asymmetrical. For example, relatively cool and dense air may settle toward the bottom of the engine 10. Conversely, hotter and less dense air may rise toward the top of the engine 10, resulting in a temperature profile that generally increases from bottom to top. In other words, components near the top of engine 10 may tend to remain hotter than components near the bottom of engine 10.

As noted, components of engine 10 may experience thermal expansion when subjected to elevated temperatures. Following engine shutdown, thermal contraction may be non-uniform, due to temperature profiles within engine 10. As the temperature of a given rotor decreases towards ambient temperature, a thermal gradient develops in the rotor leading to an upper portion of the rotor cooling more slowly than a lower portion of the rotor. This results in distortion (or bowing) within the engine, which prevents the use of the aircraft for a certain period of time (referred to as a 'lock-out time') until the engine 10 has cooled down. Bowing of the engine case may also occur, resulting in a reduction in normal build clearances and leading to potential rubbing between the engine's rotating turbomachinery and the closed-down case structure of the engine 10. The rub condition can in turn cause a hung start or performance loss for the engine 10.

Figure 1B:
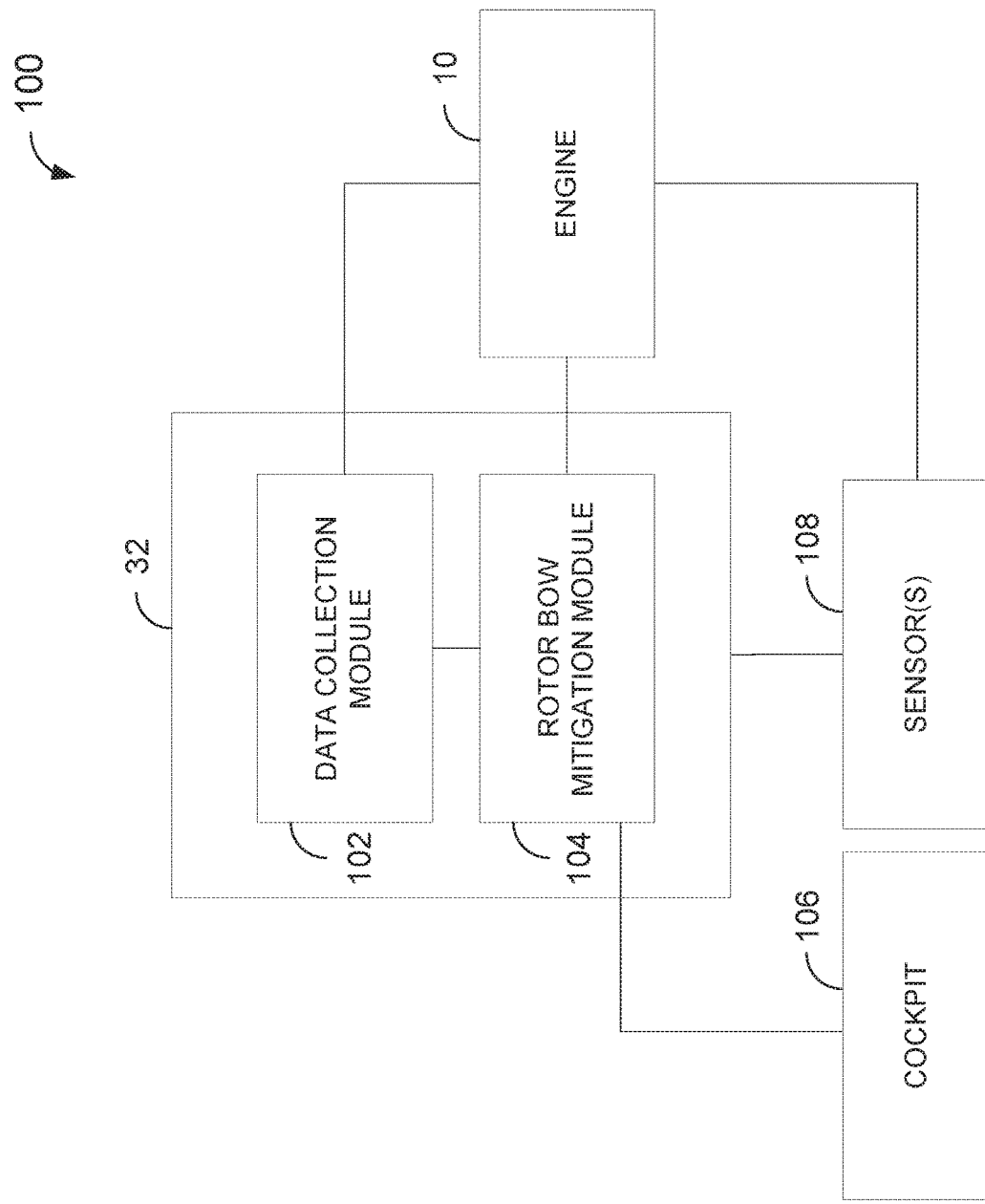
FIG. 1B is a block diagram of a start-up system for rotor bow mitigation, in accordance with an illustrative embodiment.

FIG. 1B illustrates an example start-up system 100 for rotor bow mitigation for the engine 10 of FIG. 1A. The system 100 comprises the control unit 32, which controls operation of the engine 10, and particularly operation (e.g., opening and closing) of the starter valve (reference 30 in FIG. 1A) that modulates the flow of air to the starter (reference 28 in FIG. 1A) and induces rotation of the engine's rotor assemblies. In one embodiment, the control unit 32 is an Electronic Engine Controller (EEC).

In one embodiment, the control unit 32 comprises a data collection module 102 and a rotor bow mitigation module 104. The illustrated data collection module 102 is configured to collect and store (referred to herein as 'tracking') engine parameter(s) prior to a shutdown of the engine 10, and to measure a temperature external to the engine 10 (referred to herein as an 'external temperature parameter'). As used herein, the term 'track' therefore refers to the action of collecting and storing engine parameter(s) prior to engine shutdown while the term 'measure' refers to the action of measuring a parameter in situ, upon engine start-up (e.g., in real-time). The engine parameters(s) that are tracked are illustratively recorded and stored into (and subsequently retrieved from) memory, databases, or any other suitable form of storage as they may not be measured (since they are not occurring at the time of start-up). Conversely, real-time parameters, such as the current temperature external to the engine 10, may be measured at engine start-up.

In one embodiment, the data collection module 102 is configured to sample the tracked and/or measured parameters such that the reading is indicative of a steady state value for the parameter, rather than a transient value which may not be representative of the true value of the parameters. The data collection module 102 is then configured to send the collected data to the rotor bow mitigation module 104, which is configured to determine from the received data a motoring duration (d) and a motoring interval (i) for a rotor bow mitigation procedure to be performed for alleviating (e.g., reducing) rotor distortion (or bowing). The rotor bow mitigation module 104 is indeed configured to perform a motoring procedure or sequence (i.e. 'motor' the engine 10) for the motoring duration and at the motoring interval as determined, prior to a start sequence being initiated for the engine 10. As understood by those skilled in the art, the start sequence comprises a number of successive steps (e.g., cranking of the engine 10, ignition of the engine 10, supply of fuel to the engine 10, acceleration, thermal soak at ground idle) and, when initiated, brings the engine 10 to ground idle. In particular, upon detecting a start indication (indicative of a requested or commanded initiation of the start sequence) of the engine 10, the rotor bow mitigation module 104 rotates the engine 10 below a rotational speed which adversely affects the engine 10 (e.g., at a speed lower than the resonant speed of the engine's rotor), for the specified motoring duration (d) and at the specified motoring interval (i).

In one embodiment, the motoring interval may refer to the period of time (or frequency) between the application of rotational speed that defines the engine's revolutions per minute. In another embodiment, the motoring interval may refer to the device that provides rotational power to the engine 10. For instance, the motoring interval may refer to the open and closing interval of the starter valve (reference 30 in FIG. 1A) or to the commanded on/off power from an electric motor that provides rotational power to the engine 10.

In one embodiment, the engine parameter(s) tracked by the data collection module 102 prior to shutdown include an internal temperature of the engine 10 (referred to herein as an 'internal engine temperature' parameter). For this purpose, the data collection module 102 may be configured to receive, from the sensor(s) 108, one or more measurements indicative of the internal engine temperature. In one embodiment, the sensor(s) 108 are configured to measure and transmit to the data collection module 102 one or more measurements such as the Turbine Inlet Temperature (TIT), the Interstage Turbine Temperature (ITT), the Exhaust Gas Temperature (EGT), and/or any other suitable temperature parameter(s) indicative of an internal temperature of the engine 10. In one embodiment, the internal engine temperature is indicative of the maximum temperature that the engine 10 has reached in its last operating cycle (i.e. before the last engine shutdown). Thus, a rolling maximum engine temperature parameter may be tracked and stored in memory by the data collection module 102 for the purpose of determining the motoring duration and interval. It should however be understood that, in some embodiments, the internal engine temperature parameter may be measured in situ rather than being tracked (i.e. as a rolling maximum engine temperature).

In addition to the internal engine temperature parameter, additional parameters may be used to better predict, and accordingly optimize (e.g., tailor to the engine's current thermal state), the motoring duration. For example, the data collection module 102 may be configured to receive from the sensors 108 measurement(s) indicative of vibration level(s) of the engine 10. The rotor bow mitigation module 104 may in turn be configured to adjust the speed of the engine 10 (e.g., as obtained from an N1 or N2 speed signal received from the engine 10, N1 being the engine's fan speed and N2 being the rotational speed of the engine's core compressor spool) and the motoring duration based on the vibration levels. For instance, if vibration levels increase past a predetermined speed threshold, the engine's speed may be reduced and the motoring time increased until the engine's speed is safely increased without unacceptable vibration levels that may cause damage.

As such, the data collection module 102 may be configured to track, for the purpose of determining the motoring duration and interval, an internal engine temperature and engine parameter(s) including, but not limited to, a vibration level of the engine 10, the period of time spent by the engine 10 at ground idle prior to the last engine shutdown (referred to herein as 'ground idle time'), and the elapsed time since the last engine shutdown (referred to herein as 'time since shutdown'). In one embodiment, it is desirable for the data collection module 102 to track both the ground idle time and the time since shutdown in addition to the internal engine temperature. The data collection module 102 may also measure in situ, upon starting the engine 10, one or more parameters including, but not limited to, a main oil temperature (MOT) of the engine 10, a main oil pressure (MOP) of the engine 10, ambient temperature, and ambient pressure (where the ambient temperature and pressure are indicative of ambient conditions impacting the heat transfer characteristics of air passing through the engine 10). It should be understood that any suitable engine parameter(s), which can be relevant for the purpose of determining the motoring duration and interval, may be measured and/or tracked by the data collection module 102, in addition to the internal engine temperature parameter.

As previously noted, the data collection module 102 is configured to measure (e.g., in real-time at engine start-up) an external temperature parameter in addition to the engine parameter(s). For this purpose, the data collection module 102 may be configured to receive, from the sensor(s) 108, one or more temperature measurements indicative of the external temperature parameter. In particular, the temperature measurements may be indicative of the airport ground temperature (e.g., of the aircraft landing in an airport in extreme cold or extreme heat conditions). Since the airport ground temperature significantly affects the cooling time required for the engine 10, measuring the external temperature parameter may be useful to accurately determine the motoring duration and interval. In one embodiment, the sensor(s) 108 are configured to measure and transmit to the data collection module 102 measurement(s) from an aircraft Outside Air Temperature (OAT) sensor and/or the engine's inlet temperature (T1) sensor. It should however be understood that any other suitable external temperature parameter may be measured.

As stated previously, the rotor bow mitigation module 104 illustratively uses the data received from the data collection module 102 to determine a motoring duration and a motoring interval for the engine 10 that are optimized to achieve a desired rotor bow mitigation for the engine 10. Determination of the motoring duration and interval may be achieved by querying one or more lookup tables (or other suitable data structure), which provide, for each engine parameter, one or more first values for the motoring duration and interval as a function of the values of the engine parameter. The one or more lookup tables may also provide one or more second values for the motoring duration and interval as a function of the values of the external parameter. In one embodiment, the lookup table(s) are determined via engine testing and analysis to determine the motoring duration and interval suitable to alleviate rotor bow. Table 1, Table 2, Table 3, and Table 4 below are examples of such lookup tables. These examples are for illustration purposes only. It should be understood that, since the number of engine parameter(s) tracked by the data collection module 102 may vary, the number of lookup tables may also vary. As such, lookup tables (and corresponding values) other than the ones illustrated and described herein may apply.

Table 1 below illustrates example values of the motoring duration (d) and the motoring interval (i) as a function of the maximum temperature ($Temp_{max}$) reached by the engine (i.e. the internal engine temperature) prior to shutdown, where 'Threshold' refers to a predetermined threshold temperature that may be retrieved from memory. It should however be understood that, instead of using a predetermined threshold temperature, a temperature ratio may be used.

TABLE 1

| Temperature ($Temp_{max}$) | Duration (d) | Interval (i) |
|---|---|---|
| <Threshold | $d_1$, where $d_1 = 0$ | $i_1$ |
| =Threshold | $d_2$, where $d_2 > d_1$ | $i_2$ |
| >Threshold | $d_3$, where $d_3 > d_2$ | $i_3$ |

Table 2 below illustrates example values of the motoring duration (d) and the motoring interval (i) as a function of the time since shutdown ($Time_{shutdown}$).

TABLE 2

| Time ($Time_{shutdown}$) | Duration (d) | Interval (i) |
|---|---|---|
| 0-2 hours | $d_4$, where $d_4 > d_3$ | $i_1$ |
| 2-4 hours | $d_3$, where $d_3 > d_2$ | $i_2$ |
| 6-8 hours | $d_2$, where $d_2 > d_1$ | $i_3$ |
| 8+ hours | $d_1$, where $d_1 = 0$ | $i_4$ |

Table 3 below illustrates example values of the motoring duration (d) and the motoring interval (i) as a function of the external (i.e. ambient) temperature ($Temp_{amb}$).

TABLE 3

| Temperature ($Temp_{amb}$) | Duration (d) | Interval (i) |
|---|---|---|
| <0 | $d_1$, where $d_1 = 0$ | $i_1$ |
| 0-Threshold | $d_2$, where $d_2 > d_1$ | $i_2$ |
| >Threshold | $d_3$, where $d_3 > d_2$ | $i_3$ |

Table 4 below illustrates example values of the motoring duration (d) and the motoring interval (i) as a function of the time spent by the engine 10 at ground idle ($Time_{idle}$).

TABLE 4

| Time ($Time_{idle}$) | Duration (d) | Interval (i) |
|---|---|---|
| 0-1 minutes | $d_4$, where $d_4 > d_3$ | $i_1$ |
| 1-2 minutes | $d_3$, where $d_3 > d_2$ | $i_2$ |
| 2-3 minutes | $d_2$, where $d_2 > d_1$ | $i_3$ |
| 4+ minutes | $d_1$, where $d_1 = 0$ | $i_4$ |

The rotor bow mitigation module 104 is configured to perform a correlation between the tracked engine parameter(s) (e.g., the maximum temperature before shutdown $Temp_{max}$, the time since shutdown $Time_{shutdown}$, and the time at ground idle $Time_{idle}$), the measured external temperature parameter (e.g., ambient temperature $Temp_{amb}$), and the lookup table(s) (e.g., Table 1, Table 2, Table 3, and Table 4) in order to obtain values of the motoring duration. For example, the data collection module 102 may send to the rotor bow mitigation module 104 measurements indicating that the maximum temperature before shutdown ($Temp_{max}$) is 500 degrees Celsius, the time since shutdown ($Time_{shutdown}$) is 3 hours, the time at ground idle ($Time_{idle}$) is 6 minutes, and the ambient temperature ($Temp_{amb}$) is 5 degrees Celsius. The rotor bow mitigation module 104 may further obtain (e.g., retrieve from memory) a value of 20 degrees Celsius for the temperature threshold (Threshold) to be used when correlating the data received from the data collection module 102 with the lookup tables.

The rotor bow mitigation module 104 may then obtain, upon correlating the maximum temperature ($Temp_{max}$) measurement with Table 1, a first value for the motoring duration and a first value for the motoring interval. The rotor bow mitigation module 104 may also obtain, upon correlating the time since shutdown ($Time_{shutdown}$) measurement with Table 2, a second value for the motoring duration and a second value for the motoring interval. The rotor bow mitigation module 104 may further obtain, upon correlating the ambient temperature ($Temp_{amb}$) measurement with Table 3, a third value for the motoring duration and a third value for the motoring interval. The rotor bow mitigation module 104 may finally obtain, upon correlating the time at ground idle ($Time_{idle}$) measurement with Table 4, a fourth value for the motoring duration and a fourth value for the motoring interval.

The rotor bow mitigation module 104 may then compute the final value of the motoring duration to be prescribed for the engine 10 by adding a predetermined starting motoring duration ($d_s$) and the values of the motoring durations determined from the lookup table(s), such as for the engine parameter(s) and the external temperature parameter. The starting motoring duration, which may be a time estimate specific to the application and engine configuration (e.g., engine materials and respective coefficients of thermal expansion, cooling rates, and the like), represents the minimum motoring duration for which it is desirable to perform the motoring procedure, in the best case scenario. Once specified, the value of $d_s$ may be stored in memory and retrieved therefrom by the rotor bow mitigation module 104 to perform the computations described herein. In particular, the final value of the motoring duration may be obtained using the following equation:

$$d = d_S + d_1 + \ldots + d_n \quad (1)$$

where $d_1, \ldots, d_n$ represent the values of the motoring durations determined from the lookup table(s), for a total of up to n parameters, and $d_S$ is the starting motoring duration. Continuing with the previous example, the final value of the motoring duration can be obtained by adding the values of the motoring durations obtained from Table 1, Table 2, Table 3, and Table 4 to the starting motoring duration $d_S$.

The rotor bow mitigation module 104 may also compute the final value of the motoring interval by adding a predetermined starting motoring interval ($i_s$) and the values of the motoring intervals determined from the lookup table(s), such as for the engine parameter(s) and the external temperature parameter, as discussed above. The starting motoring interval, which may be specified according to the application and engine configuration, represents the optimal motoring interval. The starting motoring interval may be a default interval, such as zero in order to obtain continuous rotational speed. Once specified, the value of $i_s$ may be stored in memory and retrieved therefrom by the rotor bow mitigation module 104 to perform the computations described herein. In particular, the final value of the motoring interval may be obtained using the following equation:

$$= i_S + i_1 + \ldots + i_n \quad (2)$$

where $i_1, \ldots, i_n$ represent the values of the motoring intervals determined from the lookup table(s), for a total of up to n parameters, and $i_s$ is the starting motoring interval. Continuing with the previous example, the final value of the motoring interval can be obtained by adding the values of the motoring intervals obtained from Table 1, Table 2, Table 3, and Table 4 to the starting motoring interval $i_s$.

It should however be understood that equations other than equations (1) and (2) may apply. For example, the motoring duration and the motoring interval may be combined in a single formula. In some embodiments, multipliers may also be used to determine the motoring duration and interval.

Upon detecting a start indication of the engine 10 (e.g., upon receipt of a commanded engine start), the rotor bow mitigation module 104 causes the engine 10 to be motored for the final value of the motoring duration and at the final value of the motoring interval, as calculated. For this purpose, the rotor bow mitigation module 104 may, upon receipt of the commanded engine start, send one or more signals to the engine 10 to cause the motoring procedure to be automatically initiated. Although not illustrated, it should be understood that, in one embodiment, the rotor bow mitigation module 104 may also send a message to the cockpit (reference 106 in FIG. 1B), via any suitable cockpit interface, to provide an indication that motoring is taking place. The motoring duration may optionally be displayed.

In one embodiment, the prescribed motoring duration and the prescribed motoring interval are respectively the motoring duration and the motoring interval determined by the rotor bow mitigation module 104. The rotor bow mitigation module 104 may then constantly monitor the status of the engine 10 in order to determine whether the motoring sequence has been completed (e.g., whether the prescribed motoring duration has elapsed). Once this is the case, the rotor bow mitigation module 104 may then send a corresponding message to the cockpit 106 (via the cockpit interface).

In one embodiment, the motoring procedure may be automatically ended once a maximum motoring duration (or a corresponding timer) has elapsed. In another embodiment, the motoring procedure may be aborted by the pilot at any time. For example, the motoring procedure may be aborted by commanding an engine shutdown, e.g. following a pilot-initiated or an EEC-initiated motoring abort command. The motoring procedure may also be aborted when the control unit 32 detects a failure or exceedance of one or more engine rotation speed sensors. For instance, the motoring procedure may be aborted by commanding an engine shutdown when speed is less than a first speed threshold for a given time period (e.g. 20 seconds), speed is less than the first threshold for a given time interval (e.g. 2 seconds) after speed has transitioned above the first threshold, speed has exceeded a second speed threshold, or there is no valid engine rotation speed sensor signal after a given time interval (e.g. 10 seconds) has elapsed since the starter valve (reference 30 in FIG. 1A) has been commanded open. In one embodiment, the first threshold corresponds to a low speed abort threshold, where the motoring procedure is aborted in the event the engine does not perform as expected (e.g. is not able to govern). In one embodiment, the second speed threshold is a threshold set to protect the rotor from approaching a resonant speed. It should also be understood that the motoring procedure may also be aborted if other component failure indications or emergency situations, such as fire, occur during the motoring procedure.

FIG. 2 is an example embodiment of a computing device 200 for implementing the control unit 32 described above with reference to FIG. 1B. The computing device 200 comprises a processing unit 202 and a memory 204 which has stored therein computer-executable instructions 206. The processing unit 202 may comprise any suitable devices configured to cause a series of steps to be performed such that instructions 206, when executed by the computing device 200 or other programmable apparatus, may cause the functions/acts/steps described herein to be executed. In one embodiment, the processing unit 202 has the ability to interpret discrete inputs and energize discrete outputs. The processing unit 202 may comprise, for example, any type of general-purpose microprocessor or microcontroller, a digital signal processing (DSP) processor, a CPU, an integrated circuit, a field programmable gate array (FPGA), a reconfigurable processor, other suitably programmed or programmable logic circuits, or any combination thereof.

The memory 204 may comprise any suitable known or other machine-readable storage medium. The memory 204 may comprise non-transitory computer readable storage medium, for example, but not limited to, an electronic, magnetic, optical, electromagnetic, infrared, or semiconductor system, apparatus, or device, or any suitable combination of the foregoing. The memory 204 may include a suitable combination of any type of computer memory that is located either internally or externally to device, for example random-access memory (RAM), read-only memory (ROM), electro-optical memory, magneto-optical memory, erasable programmable read-only memory (EPROM), and electrically-erasable programmable read-only memory (EEPROM), Ferroelectric RAM (FRAM) or the like. Memory 204 may comprise any storage means (e.g., devices) suitable for retrievably storing machine-readable instructions 206 executable by processing unit 202.

Figure 3:
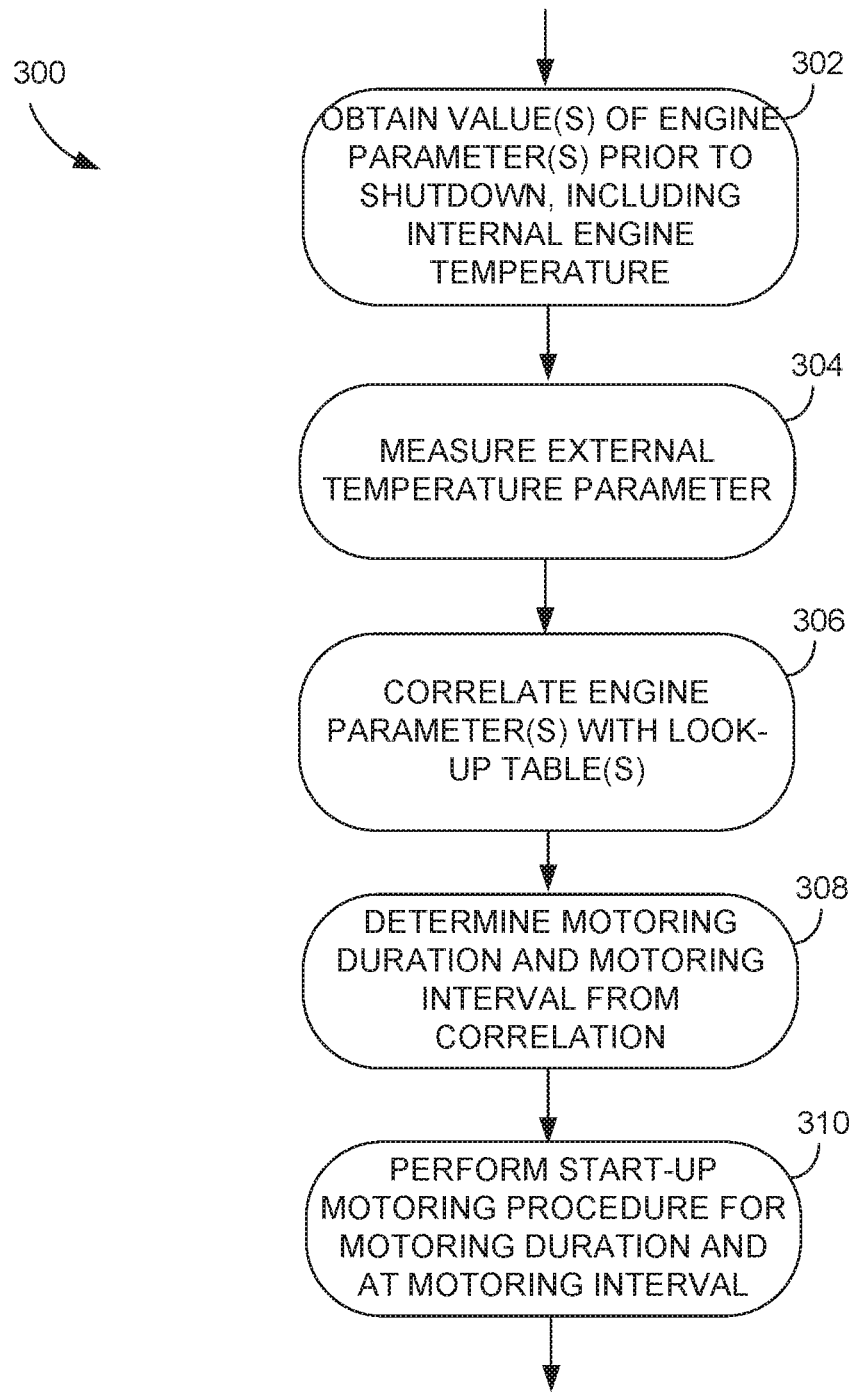
FIG. 3 is a flowchart of a start-up method for rotor bow mitigation, in accordance with an illustrative embodiment.
Figure 4:
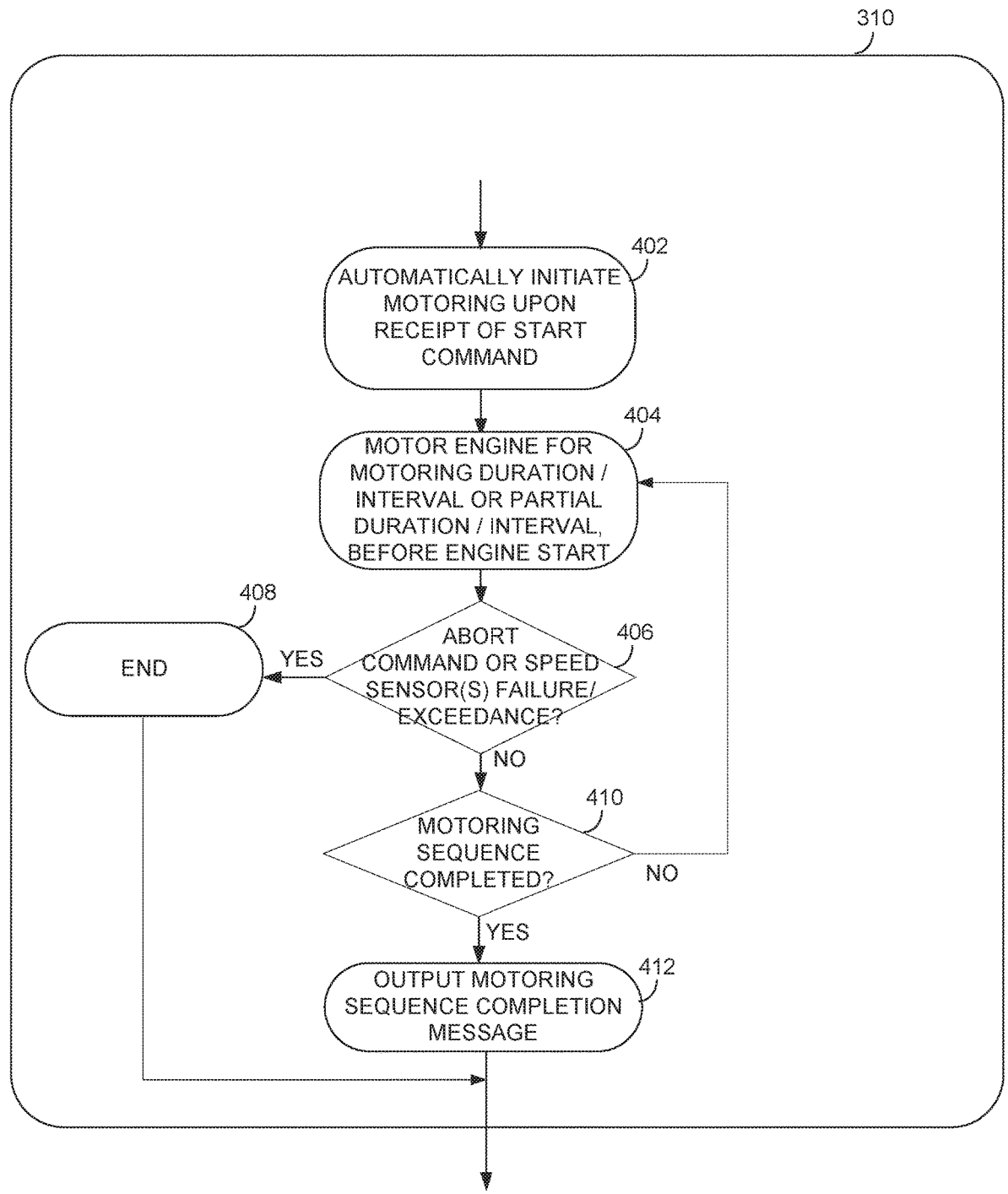
FIG. 4 is a flowchart of the step of FIG. 3 of performing a start-up motoring procedure.

Referring now to FIG. 3 and FIG. 4, an example start-up method 300 for rotor bow mitigation will now be described. The method 300 may be implemented by the computing device 200 of FIG. 2. The method 300 comprises obtaining value(s) of the engine parameter(s) prior to engine shutdown (step 302). For this purpose and prior to engine shutdown, engine parameter(s) including an internal engine temperature parameter may be tracked in the manner described above with reference to FIG. 1B. An external temperature parameter is also measured (e.g., in real-time at engine start-up) at step 304. The engine parameter(s) and the external temperature parameter are then correlated with one or more lookup tables (step 306) and the motoring duration and motoring interval to be prescribed to the engine are determined from the correlation at step 308, as described above with reference to FIG. 1B. A start-up motoring procedure is then performed at step 310, for the motoring duration and at the motoring interval determined at step 308.

As shown in FIG. 4, step 310 illustratively comprises automatically initiating motoring of the engine 10 upon receipt of a command to start the engine 10 (step 402). The next step 404 is to motor the engine 10 for a prescribed motoring duration and interval, prior to engine start. As discussed above with reference to FIG. 1A, in one embodiment, the prescribed duration and interval may respectively be the motoring duration and interval determined at step 308.

The next step 406 may then be to assess whether a pilot-initiated abort command or a failure or exceedance of the engine rotation speed sensor(s) (e.g. an EEC-initiated abort event) has occurred. If this is the case, the motoring procedure is aborted and the method ends (step 408). Otherwise, the next step 410 is to assess whether the motoring sequence has been completed (e.g., the prescribed motoring duration has elapsed). If this is not the case, the method flows back to step 404 to continue the motoring procedure. Otherwise, a message indicating that the motoring sequence is now complete may be output at step 412. Upon completion of the motoring procedure, starting of the engine 10 may then be initiated.

In one embodiment, the start-up rotor bow mitigation method described herein takes into account parameters that may better predict motoring time. In addition, it is proposed herein to use a formulaic approach that involves a number of parameters to determine the motoring time and motoring interval, thus taking into account the status of a variety of parameters that may affect the engine's rotor bow status. As a result, in one embodiment, the motoring time and motoring interval may be more precisely computed, thus reducing the aircraft's lock-out time.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

The invention claimed is:

1. A rotor bow mitigation method for an aircraft engine, the method comprising, at a processing device:
obtaining, during a current operating cycle of the engine, at least one value of at least one engine parameter prior to a shutdown of the engine, the at least one value of the at least one engine parameter comprising a maximum value of a first temperature internal to the engine, the maximum value reached during a last operating cycle of the engine;

measuring a second temperature external to the engine;

determining a motoring duration and a motoring interval for the engine based on at least the first temperature and on the second temperature;

upon detecting a start indication for the engine, motoring the engine for the motoring duration and at the motoring interval;

performing a correlation between the at least one engine parameter, the second temperature, and at least one lookup table, the at least one lookup table providing at least one first value for the motoring duration and at least one first value for the motoring interval as a function of the at least one engine parameter, and a second value for the motoring duration and a second value for the motoring interval as a function of the second temperature;

obtaining, from the at least one lookup table, the at least one first value for the motoring duration, the at least one first value for the motoring interval, the second value for the motoring duration, and the second value for the motoring interval;

computing a sum of the at least one first value for the motoring duration, the second value for the motoring duration, and a pre-determined starting duration for determining the motoring duration; and computing a sum of the at least one first value for the motoring interval, the second value for the motoring interval, and a pre-determined starting interval for determining the motoring interval.

2. The method of claim 1, wherein the first temperature comprises one of a turbine inlet temperature of the engine, an interstage turbine temperature of the engine, and an exhaust gas temperature of the engine.

3. The method of claim 1, wherein obtaining the at least one value of the at least one engine parameter further comprises obtaining at least one of an elapsed time since a last shutdown of the engine, a period of time spent by the engine at ground idle prior to the last shutdown of the engine, and a vibration level of the engine.

4. The method of claim 1, wherein measuring the second temperature comprises measuring at least one of an inlet temperature of the engine and an outside air temperature.

5. The method of claim 1, wherein motoring the engine comprises rotating the engine at a rotational speed lower than a resonant speed of a rotor of the engine, for the motoring duration and at the motoring interval.

6. The method of claim 1, wherein motoring of the engine is automatically initiated upon detecting the start indication for the engine.

7. A rotor bow mitigation system for an aircraft engine, the system comprising:

a memory; and a processing unit coupled to the memory and configured for:

obtaining, during a current operating cycle of the engine, at least one value of at least one engine parameter prior to a shutdown of the engine, the at least one value of the at least one engine parameter comprising a maximum value of a first temperature internal to the engine, the maximum value reached during a last operating cycle of the engine;

measuring a second temperature external to the engine;

determining a motoring duration and a motoring interval for the engine based on at least the first temperature and the second temperature;

upon detecting a start indication for the engine, motoring the engine for the motoring duration and at the motoring interval;

performing a correlation between the at least one engine parameter, the second temperature, and at least one lookup table, the at least one lookup table providing at least one first value for the motoring duration and at least one first value for the motoring interval as a function of the at least one engine parameter, and a second value for the motoring duration and a second value for the motoring interval as a function of the second temperature;

obtaining, from the at least one lookup table, the at least one first value for the motoring duration, the at least one first value for the motoring interval, the second value for the motoring duration, and the second value for the motoring interval;

computing a sum of the at least one first value for the motoring duration, the second value for the motoring duration, and a pre-determined starting duration for determining the motoring duration; and computing a sum of the at least one first value for the motoring interval, the second value for the motoring interval, and a pre-determined starting interval for determining the motoring interval.

8. The system of claim 7, wherein the processing unit is configured for obtaining the first temperature comprising obtaining one of a turbine inlet temperature of the engine, an interstage turbine temperature of the engine, and an exhaust gas temperature of the engine.

9. The system of claim 7, wherein the processing unit is configured for obtaining the at least one value of the at least one engine parameter further comprising obtaining at least one of an elapsed time since a last shutdown of the engine, a period of time spent by the engine at ground idle prior to the last shutdown of the engine, an ambient pressure, an ambient temperature, a main oil temperature of the engine, a main oil pressure of the engine, and a vibration level of the engine.

10. The system of claim 7, wherein the processing unit is configured for measuring the second temperature comprising measuring at least one of an inlet temperature of the engine and an outside air temperature.

11. The system of claim 7, wherein the processing unit is configured for motoring the engine comprising rotating the engine at a rotational speed lower than a resonant speed of a rotor of the engine, for the motoring duration and at the motoring interval.

12. The system of claim 7, wherein the processing unit is configured for automatically initiating motoring of the engine upon detecting the start indication for the engine.

13. A non-transitory computer readable medium having stored thereon program code executable by a processor for:

obtaining, during a current operating cycle of an aircraft engine, at least one value of at least one engine parameter prior to a shutdown of the aircraft engine, the at least one value of the at least one engine parameter comprising a maximum value of a first temperature internal to the engine, the maximum value reached during a last operating cycle of the engine;

measuring a second temperature external to the engine;

determining a motoring duration and a motoring interval for the engine based on at least the first temperature and the second temperature;

upon detecting a start indication for the engine, motoring the engine for the motoring duration and at the motoring interval;

performing a correlation between the at least one engine parameter, the second temperature, and at least one lookup table, the at least one lookup table providing at least one first value for the motoring duration and at least one first value for the motoring interval as a function of the at least one engine parameter, and a second value for the motoring duration and a second value for the motoring interval as a function of the second temperature;

obtaining, from the at least one lookup table, the at least one first value for the motoring duration, the at least one first value for the motoring interval, the second value for the motoring duration, and the second value for the motoring interval;

computing a sum of the at least one first value for the motoring duration, the second value for the motoring duration, and a pre-determined starting duration for determining the motoring duration; and computing a sum of the at least one first value for the motoring interval, the second value for the motoring interval, and a pre-determined starting interval for determining the motoring interval.

* * * * *